No. 846,838. PATENTED MAR. 12, 1907.
W. A. FANNON.
LOG SPLITTING MACHINE.
APPLICATION FILED DEC. 5, 1904.
2 SHEETS—SHEET 1.
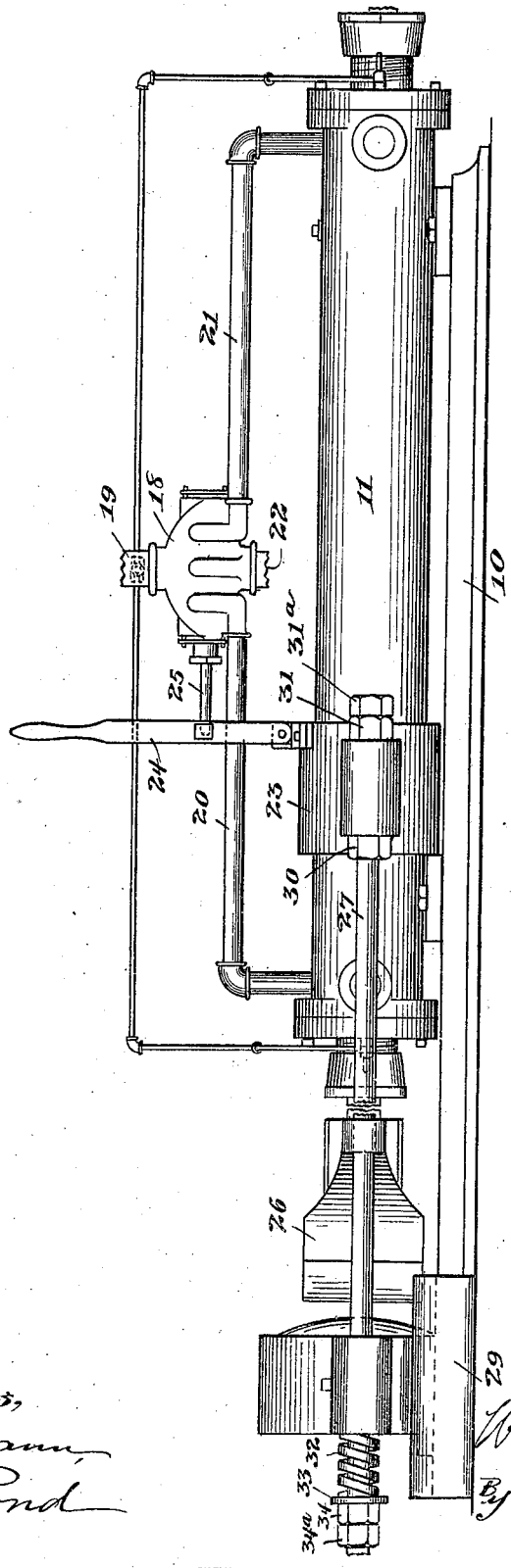
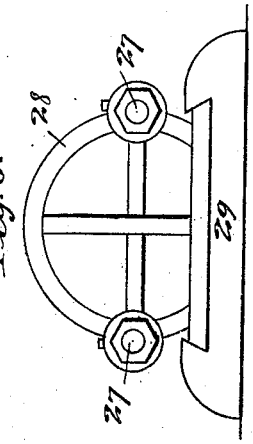
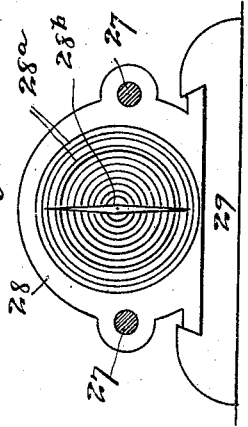

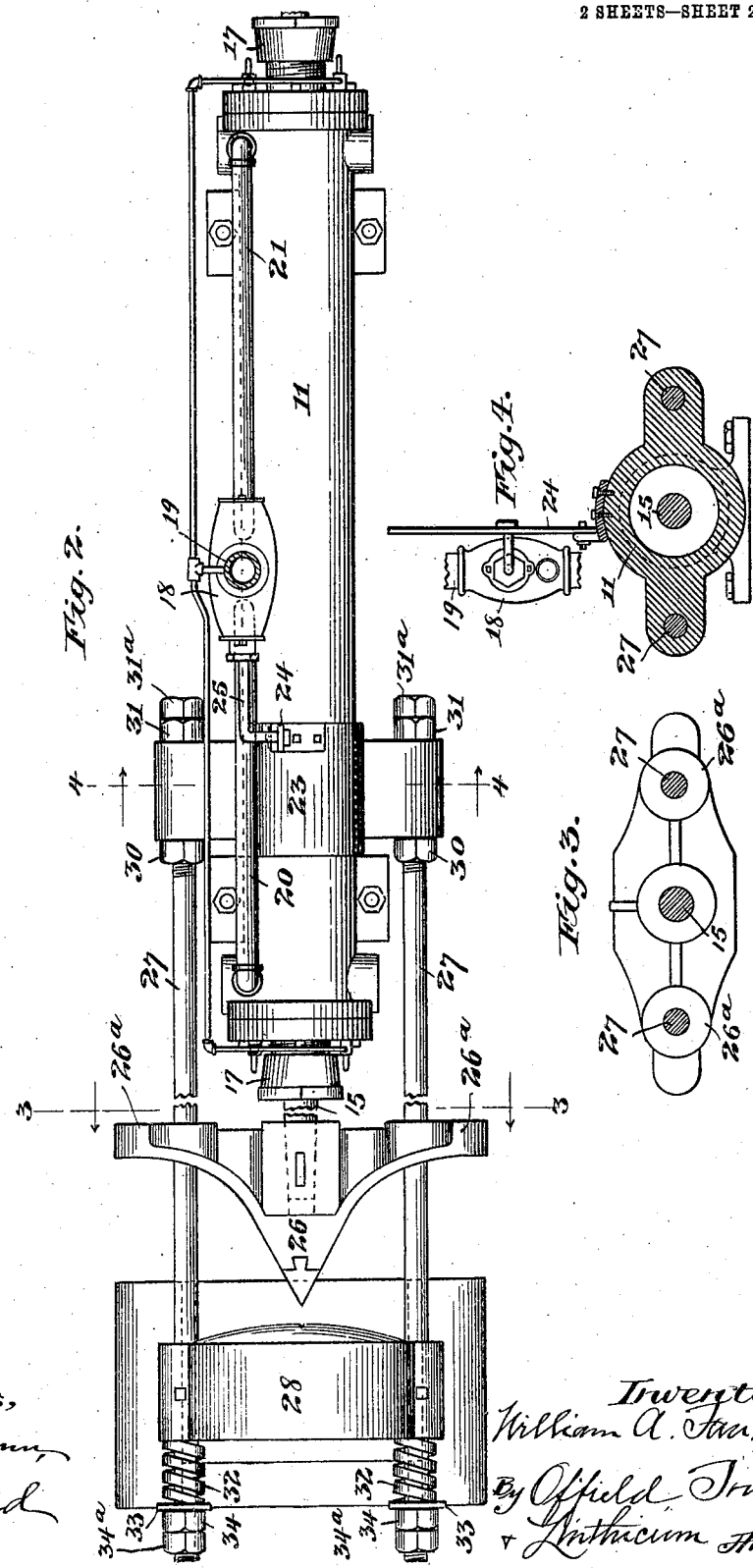

UNITED STATES PATENT OFFICE.

WILLIAM A. FANNON, OF APPLETON, WISCONSIN.

LOG-SPLITTING MACHINE.

No. 846,838.  Specification of Letters Patent.  Patented March 12, 1907.

Application filed December 5, 1904. Serial No. 235,651.

*To all whom it may concern:*

Be it known that I, WILLIAM A. FANNON, a citizen of the United States, residing at Appleton, in the county of Outagamie and State of Wisconsin, have invented certain new and useful Improvements in Log-Splitting Machines, of which the following is a specification.

My invention relates to machines for splitting logs; and has for its principal object to provide a machine of increased simplicity and efficiency wherein the power may be applied in the most direct manner to the ax and with a minimum of loss through friction and wear of parts.

Another object of the invention is to provide a machine wherein the introduction of the logs to the machine and the subsequent discharge of the split sections may be accomplished with facility and expedition.

A still further object is to provide a machine wherein the shock of the jars necessarily incident to the operation of a machine of this character shall be reduced to the minimum, thus prolonging the wearing qualities and life of the machine.

Other minor objects and uses of the invention will appear hereinafter in connection with the detailed description of the invention.

In carrying out my invention I preferably provide a suitable bed-plate, upon which is mounted a substantially horizontal cylinder of considerable length containing a piston or plunger having a stem extending through a stuffing-box in one end of the cylinder and carrying at its outer end an ax-head. The cylinder is provided with means for admitting and discharging fluid-pressure alternately to and from the opposite ends thereof by a manually-controlled valve, and where a single ax is employed on a suitable support opposite and in advance of the ax is mounted an abutment against which one end of the log may rest preliminary to receiving the blow of the ax. Between the abutment and the adjacent end of the cylinder is provided means for supporting a log in position to receive the blow of the ax and for guiding and maintaining the ax in fixed relation to the cylinder and log during the splitting operation, and preferably the abutment is equipped with cushioning means to absorb the shock and jar produced by the blows of the ax upon the log. The foregoing elements constitute in outline the principal and essential parts of a machine embodying my invention, although certain features of the invention are independent of the horizontal or other disposition of such principal parts.

My invention will be clearly understood by reference to the accompanying drawings, wherein I have illustrated a machine embodying in simple form the principle of my invention; and referring thereto—

Figure 1 is a side elevational view of a form of machine employing a single ax. Fig. 2 is a top plan view of the same. Fig. 3 is a cross-sectional view on the line 3 3 of Fig. 2. Fig. 4 is a cross-sectional view on the line 4 4 of Fig. 2. Fig. 5 is a face elevational view of the abutment against which the log rests in the splitting operation, and Fig. 6 is a rear elevational view of the said abutment.

Referring to the drawings, 10 designates a bed-plate, upon which is rigidly secured a horizontally-disposed cylinder 11, of considerable length, as shown. In this cylinder is the usual piston or plunger (not shown) secured on the piston-rod 15, that extends through one or both cylinder-heads 16, having a fluid-tight sliding fit in the latter by means of the stuffing-boxes 17.

18 designates a valve-chest, which is provided with a fluid-pressure inlet-pipe 19 and a sliding valve and ports communicating with pipes 20 and 21, leading to opposite ends of the cylinder and with an exhaust-pipe 22, the same as in the usual and common type of reciprocating steam-engine valve.

Adjacent to and, as herein shown, integral with and embracing the cylinder 11 is a fixed cross-head 23, on which is pivotally mounted at its lower end a valve-controlling lever 24, to which the valve-stem 25 is connected.

Secured to one end of the piston-rod 15 is an ax-head 26, which latter is slidingly supported by means of apertured wings 26$^a$ on a pair of laterally rigid guiding and supporting rods 27, which latter are secured at one end in opposite ends of the cross-head 23 and at their other end are slidably mounted in opposite sides of an abutment-block 28, which latter is slidingly supported, preferably by the dovetailed joint shown in Figs. 5 and 6, upon a stationary bed-plate 29. The rods 27 are secured in the cross-head 23 against longitudinal movement, as by nuts 30 and 31 and lock-nuts 31$^a$, while compression-springs 32, mounted on the opposite ends of said rods between the rear of the abutment-block and collars 33, backed by nuts 34 and lock-nuts 34ª, serve as a cushion for the abutment-block 28.

In operation the movement of the lever 24 one way or the other controls the admission and exhaust of motive fluid to the cylinder 11, as in the case of any ordinary steam or pneumatic engine. When the ax has been retracted, a log to be split is laid upon or between the rods 27, which in practice are usually sufficiently close together to serve the purpose of a bed or support for the logs, the rear end of the log lying against the face of the abutment-block 28, which, it will be observed by reference to Fig. 5, is preferably scored or indented by a plurality of concentric circles 28ª to increase the holding and centering effect of the abutment upon the log and is still further provided with a vertical groove 28ᵇ, corresponding in contour to the point or edge of the ax and serving to prevent the ax from being dulled through contact with the face of the abutment-block. The space between the abutment-block and the ax when the latter is in its fully-retracted position is considerably in excess of the length of the log, so that the ax on its forward or splitting stroke acquires considerable momentum and force before striking the log. As the blow is received it is cushioned by the springs 32, thus diminishing the shock to the machine created by the blow and permitting the ax to pass through the log under a slightly-yielding resistance. When the splitting operation is complete, the lever 24 is reversed to retract the ax. The split sections fall between or outside the supporting-rods 27 and are removed, and a new log is introduced to the machine and the above-described operations repeated.

From the foregoing it will be seen that the ax-head itself is directly mounted slidably upon and between the laterally-rigid guide-rods, which latter prevent any lateral displacement of the ax-head in any direction at all points of its working stroke, thus insuring the maintenance of the ax-head in a fixed relation to both the cylinder and the work operated upon. The guide-rods serve not only this important function of maintaining the lateral rigidity of the ax-head, but in the arrangement shown they also serve the further function of accurately positioning and supporting the logs preliminary to the stroke of the ax.

While I have shown in Figs. 1 and 2 only a single ax connected with but one end of the piston-rod, yet it will be readily understood that the mechanism shown at the left of the cylinder in these figures might be duplicated at the right of the cylinder, thus producing, in effect, a double-acting splitter wherein one ax would be performing its work of striking simultaneously with the return stroke of the other ax.

I am aware that it has heretofore been proposed to operate the ax of a log-splitting machine directly by means of a piston on the rod or stem of the ax operated upon by steam-pressure in an arrangement wherein the ax was vertically reciprocable. My invention, on the contrary, while not depending upon the described horizontal arrangement as regards all of the novel features and advantages thereof, yet possesses numerous advantages resulting from such horizontal arrangement over the vertical arrangement, such as the following: In the first place in the horizontal arrangement the factor of the gravity of the ax and its actuating parts is eliminated, and the machine can thus be more nicely regulated with respect to the power of the blows. In the second place, it is immaterial in the horizontal form of the machine whether the ends of the logs be cut perfectly square, or only approximately so, whereas in the vertical form unless the logs are cut perfectly square they will not be disposed parallel with the path of travel of the ax and will be split in irregular and uneven sections. Again, a horizontal arrangement greatly facilitates the labor of handling the logs in introducing them to and withdrawing them from the machine, as compared with the vertical arrangement, in that it obviates the necessity of turning the logs up on end and permits them to be simply rolled into position to be acted upon by the machine. Still another advantage of the horizontal arrangement resides in the fact that it dispenses with the necessity of providing means for holding the ax in retracted position, such as a body of motive fluid beneath the piston or some mechanical device to support the weight of the ax and plunger when raised.

My invention has been designed more particularly to facilitate the preparation of pulp of wood that is intended for use in the manufacture of paper. In such treatment of wood the logs when cut into certain lengths are subjected to the action of chipping-machines, which reduces them to a form and condition in which they are ready for the digesters; but it happens that a great many logs are too large to be handled by the chipping-machine without having been first reduced in size by being split, and it is in connection with the latter operation that the machine of my present invention is particularly useful. It will be understood, however, that the machine is of course capable of advantageous employment in the splitting of logs for any other purpose or purposes and is in no wise limited to its use in connection with the preparation of logs for paper-making machinery, and while I have described my machine as a log-splitting apparatus yet it will readily be understood that the machine if provided with cylinders of sufficient power and properly shaped ax-heads would be also adaptable to cross-cutting wood. It is also evident that the machine as described and shown in the drawings is capable of considerable modification in respect to details of construction and form and relative arrangement of parts without substantial variance from the gist and principle of the invention, and hence I do not limit the latter to the particular machine shown and described, except to such extent as the latter may be stated in specific claims.

I claim—

1. In a log-splitting machine, the combination with a substantially horizontal cylinder, piston and piston-rod, of an abutment member for the log, laterally rigid guide-rods between said cylinder and abutment member, an ax-head secured to the piston-rod slidably mounted on said guide-rods, said guide-rods serving to maintain a fixed relation of said ax-head to the cylinder and to the log during the splitting operation.

2. In a log-splitting machine, the combination with a substantially horizontal cylinder, piston and piston-rod, of an abutment member for the log, laterally rigid guide-rods between said cylinder and abutment member, an ax-head secured to the piston-rod slidably mounted on said guide-rods, said guide-rods being suitably spaced to serve as a support for the log and also serving to maintain a fixed relation of said ax-head to the cylinder and to the log during the splitting operation.

3. In a log-splitting machine, the combination with a substantially horizontal cylinder, piston, and piston-rod, of a pair of guide-rods rigid at one end with and extending longitudinally of and beyond said cylinder, an elastically-backed abutment member slidably mounted on the other end of said guide-rods, an ax-head secured to the piston-rod of said cylinder slidably mounted on said guide-rods, said guide-rods being suitably spaced to serve as a support for the log and also serving to maintain a fixed relation of said ax-head to the cylinder and to the log during the splitting operation.

4. In a log-splitting machine, the combination with a substantially horizontal cylinder, piston, and piston-rod, of an abutment member for the log, laterally rigid guide-rods between and connecting said cylinder and abutment member, an ax-head secured to the piston-rod of said cylinder slidably mounted on said guide-rods, said guide-rods serving to maintain a fixed relation of said ax-head to the cylinder and to the log during the splitting operation, and means for cushioning the piston at the limit of its working stroke.

5. In a log-splitting machine, the combination with a substantially horizontal cylinder having apertured lateral projections rigid therewith, a piston, and a piston-rod, of an abutment member also provided with apertured lateral projections, guide-rods secured in and between the lateral projections of said cylinder and abutment member, and an ax-head secured to said piston-rod and having apertured lateral ears whereby it is slidably mounted on the said guide-rods and maintained in fixed relation to said cylinder and the log during the splitting operation.

6. In a log-splitting machine, the combination with a cylinder and means for admitting and exhausting motive fluid thereto and therefrom, of a piston therein having a piston-rod, an ax-head on the end of said rod, a bed-plate in advance of said ax-head, an abutment for a log slidably mounted on said bed-plate, a pair of guide-rods rigid with the cylinder at one end and slidably engaged at their other end by said abutment, and cushioning-springs on said rods in rear of said abutment.

7. In a log-splitting machine, the combination with a cylinder and means for admitting and exhausting motive fluid thereto and therefrom, of a piston therein having a piston-rod, an ax-head on the end of said rod, a bed-plate in advance of said ax-head, an abutment for a log slidably mounted on said bed-plate, a cross-head rigid with the cylinder, a pair of guide-rods secured at one end in said cross-head and slidably engaged at their other end by said abutment, and cushioning-springs on said rods in rear of said abutment.

WILLIAM A. FANNON.

Witnesses:
R. RICHARD,
LOUIS O. WIPMAN.